United States Patent [19]

Lemper

[11] 4,029,863

[45] June 14, 1977

[54] METHOD OF OBTAINING SMALL PARTICLE SIZE POLYMERS AND COPOLYMERS OF VINYL CHLORIDE BY BULK POLYMERIZATION

[75] Inventor: Anthony L. Lemper, Tonawanda, N.Y.

[73] Assignee: Hooker Chemicals & Plastics Corporation, Niagara Falls, N.Y.

[22] Filed: July 21, 1975

[21] Appl. No.: 597,617

Related U.S. Application Data

[63] Continuation-in-part of Ser. No. 169,838, Aug. 6, 1971, abandoned.

[52] U.S. Cl. .................................. 526/88; 526/194; 526/212; 526/213; 526/344; 526/345; 526/909
[51] Int. Cl.² ...................... C08F 2/02; C08F 14/06
[58] Field of Search ............... 260/92.8 R; 526/88, 526/212, 194, 344, 345, 909, 213

[56] References Cited

UNITED STATES PATENTS

| | | | |
|---|---|---|---|
| 3,151,103 | 9/1964 | Heckmaier et al. | 260/92.8 R |
| 3,522,227 | 7/1970 | Thomas | 260/92.8 R |

Primary Examiner—John Kight, III
Attorney, Agent, or Firm—Peter F. Casella; James F. Mudd; David A. Stein

[57] ABSTRACT

In a process of bulk vinyl chloride polymerization involving a two stage stationary reaction zone polymerization wherein high speed agitation is used during the first stage and slow speed agitation is used in the second stage, the polymerization in the first stage is conducted in contact with an organic or inorganic, inert, fine particle size material, solid at least at reaction temperatures and insoluble in the monomer or monomers used, or an anionic, cationic, or nonionic surfactant, or mixtures thereof. By the present polymerization method using economical conventional agitation equipment, small particle size polyvinyl chloride homopolymers or copolymers are produced which are useful as extender resins in plastisols.

10 Claims, No Drawings

METHOD OF OBTAINING SMALL PARTICLE SIZE POLYMERS AND COPOLYMERS OF VINYL CHLORIDE BY BULK POLYMERIZATION

CROSS-REFERENCE TO RELATED APPLICATION

This is a continuation-in-part of copending application Ser. No. 169,838, filed Aug. 6, 1971 now abandoned.

BACKGROUND OF THE INVENTION

1. Field of the Invention

This invention relates to the production of homopolymers and copolymers of vinyl chloride having reduced grain size obtained by the bulk polymerization of the monomer or monomers by a two stage process more fully described in British Pat. No. 1,047,489. Such fine grain homopolymers and copolymers of 20 microns-50 micron grain size and narrow grain size distribution are useful in the preparation of plastisols and organosols in applications where bulk polymerized polymers were previously unsuited because of excessive grain size, irregular shape and wide grain size distribution. Heretofore, average grain sizes in the range of 80–150 microns were produced by prior art bulk polymerization and only by the more costly suspension or emulsion polymerization processes were fine grain size polymers obtainable.

2. Description of the Prior Art

According to British Pat. No. 1,047,489, it has been found that raising the speed of agitation during the first stage of polymerization has the effect of increasing the apparent specific gravity and contracting the distribution of grain sizes in the resin finally obtained. However, a compromise must be reached between high speed agitation during polymerization and reduction of the encrustation of the polymerization vessel during the polymerization. Thus the process described in British Pat. No. 1,047,489 also involves the use of slow speed agitation which is maintained during the second stage of the polymerization process; the agitator passes close to the walls of the polymerization vessel so as to minimize encrustation of the wall with polymer.

Heckmaier et al., U.S. Pat. No. 3,151,103 teaches production of a vinyl chloride homopolymer or copolymer using a bulk polymerization technique involving wherein agitation is accomplished by the use of a moving polymerization vessel, such as an autoclave, containing freely movable, indifferent bodies such as balls or rods of inert material, i.e. on movement of the vessel, the movable bodies agitate the polymerization mass.

The reference process is primarily directed to improving the electrical properties of the polymer product but also accomplishes reduction in polymer particle size. The reference process effects polymerization in the presence of certain metallic oxides and hydroxides, inter alia; silica, e.g. fumed silica, calcium oxide or hydroxide. The products of Examples 1–4 of the reference are reported to be reduced in grain size as indicated by greater passage through a 0.2 millimeter, i.e. 200 micron, sieve. Example 1 of the reference discloses that in polymerization in the absence of calcium oxide, the proportion of grains passing through a 0.2 millimeter sieve is 45% and that a total of 60% of the product grains pass through such a sieve when 0.5% of calcium oxide is present during the polymerization. This reduction in particle size amounts to the passage of only 15% more polyvinyl chloride particles through the sieve where calcium oxide is used than where no calcium oxide is used in the control. Similar results are given in the reference in Examples 2, 3 and 4 where the metallic oxide or hydroxide used results respectively in a total of 67% grains passing through the sieve or an increase of 22%, a total of 67.5% grain passage or an increase in 22.5% and a total of 63% grain passage amounting to an increase of only 18%. The highest amount of grain passage through the 0.2 millimeter sieve obtained in the reference examples is a total of about 67% of the polyvinyl chloride product, but there is no explicit disclosure of the average particle size of the product. The percentage of grain passage obtained over and above a control which shows a grain passage of 45% ranges from 15% to 22.5% with the fumed silica as the oxide additive in Example 4 providing a mere 18% increase over the 45% grain passage of the control for a total of 63% total grain passage through the 0.2 millimeter sieve. The minimum average product grain size is thus indicated to be only slightly under 200 microns. The indicated particle size of the reference product is thus substantially greater than the maximum average particle size obtained by the invention as hereinafter described The reference process is also disadvantageous in its requirement to use an agitation technique that is both impractical and inconvenient, especially for large scale commercial polymerization. The use of freely movable bodies as agitation bodies propelled by movement of the entire reactor or reaction zone according to the U.S. Pat. No. 3,151,103 process entails a costly outlay of power to maintain agitation of the polymerization mass as compared to agitation achieved by conventional agitation means in a conventional stationary reaction zone. Moreover the constant impact of the agitation bodies on the walls of the reactor in the reference process would necessitate use of a reactor specially constructed for strength to withstand such impact over a prolonged period.

By the method of the invention polymers prepared in the presence of fumed silica having unexpectedly smaller average particle sizes than those of U.S. Pat. No. 3,151,103 are obtained while avoiding the costly, inconvenient and impractical moving reaction zone with freely movable agitation bodies required by the reference process to obtain a small particle size product.

SUMMARY OF THE INVENTION

This invention relates to methods of obtaining small particle size homopolymers and copolymers of vinyl chloride by a bulk polymerization process involving high speed agitation during a first stage in which about 3 to about 15 percent preferably about 7 to about 12 percent by weight of the monomer or monomers are converted and polymerization in a second stage involving low speed agitation for the remainder of the reaction. In the process of the invention, there is incorporated as an additive in the first stage reaction, an organic or inorganic inert particulate material either alone or in combination with a nonionic, cationic, or anionic surfactant and alternately a nonionic, cationic, or anionic surfactant is incorporated without the inert particulate material. It is believed critical to incorporate the additive to control particle size growth during the first stage polymerization rather than during the second stage of polymerization wherein slow speed agitation is used. By the method of the invention, small particle size polyvinyl chloride homopolymer and copolymer resins are obtained which are comparable in particle size to polymers and copolymers obtained by suspension polymerization processes for production of fine particle size polymers. Generally the average polymer particle size obtained in the present process is about 85 microns or under.

Polymerization according to the present process is carried out in a conventional stationary polymerization reaction zone employing therein a conventional, reaction mixture-inert agitator, i.e. an agitation body, such as a propeller, impeller, stirring paddle, screw, bar or blade. Such agitation body or bodies are movable, but unlike those of the aforementioned Heckmaier et al. patent, are not freely movable in the polymerization reaction zone. This is so since the present agitation body or bodies are movable only in direct response to an agitator motor means, e.g. a variable speed conventional agitator motor, the present agitation body or bodies being connected thereto by a linking means, such as a mechanical drive shaft, a magnetic field or the like, which connection limits the movement of the agitator body within the present stationary reaction zone. Such limitation of movement of the agitator is highly desirable since it substantially avoids the aforementioned undesirable impact of the agitator body against the reactor wall as in the Heckmaier et al moving reactor process.

DESCRIPTION OF THE PREFERRED EMBODIMENTS

The method of the invention contemplates incorporating in a first stage polymerization of vinyl chloride 0.01 percent to 5 percent by weight, based on the monomer or monomers present in the first stage of the vinyl chloride polymeriztion of an additive to control polymer particle size having an average particle size in the range of about 0.001 to about 50 microns. A suitable additive is fumed silica sold by Degussa under the tradename "Aerosil". The silica can be treated with an agent to render it hydrophobic. such a treating agent is dichlorodimethylsilane which is used to produce a fumed silica sold under the tradename "Aerosil R-972" by Degussa. The silica used preferably is a fumed silica having an average particle size below $10^{-1}$ microns.

It is contemplated that both organic and inorganic solid particulate matter which is both insoluble in vinyl chloride monomer and solid at temperatures at least up to reaction temperatures can be used in conjunction with monomers disclosed in the invention in a bulk polymerization process to provide a reduction in particle size of the polymers produced. The average particle size of the solid, inert, particulate matter can be in the range of 0.001 micron to about 50 microns with an average particle size range of 0.01 micron to about 15 microns preferred. An example of an organic solid particulate material useful in the process of the invention is emulsion polymerized vinyl chloride having an average particle size of two microns. Examples of inorganic solid particulate materials other than fumed silica useful in the process of the invention are carbonates such as calcium, magnesium, zinc, cadmium, and barium carbonates, aluminum silicates, and talc. Where large quantities of solid inert matter can be added to the monomer without adding excessively to the cost or detracting from the physical properties of the polymers obtained, it is possible to use organic or inorganic solid inert particulate matter having an average particle size range up to 50 microns. An operable amount of useful solid inert particulate matter may thus be obtained from materials having greater than the above preferred average particle size.

The surfactants, or surface active agents, used in combination with vinyl chloride monomer or monomers can be of the nonionic, cationic, or anionic type and present in the range of 0.01 percent to 5 percent by weight based upon the monomer or monomers present in the first stage polymerization.

The surface active agents are agents having structurally unsymetrical molecules containing both hydrophilic and hydrophobic moieties. The nonionics do not ionize but may acquire hydrophilic character from an oxygenated side chain, usually polyoxyethylene. The oil-soluble part of the molecule can be aliphatic or aromatic in nature. The cationics ionize so that the oil-soluble portion is positively charged. Principal examples are quaternary ammonium halides such as benzethonium chloride and cetalkonium chloride. The kanionics form negatively charged ions contained in the oil-soluble portion of the molecule. The ionizable group is the hydrophilic portion. Examples are sodium salts or organic acids, such as stearic acid and sulfonates or sulfates such as alkylaryl sulfonates, i.e., sulfonates of dodecylbenzene and sulfates of straight chain primary alcohols either fatty alcohols or products of the Oxo process, i.e., sodium lauryl sulfate. Examples of nonionic surfactants that have proven effective are octylphenoxy polyethoxyethanols sold under the tradename "Triton X-100" and "Triton X-35" by the Rohm and Haas Company, Philadelphia, Pa. Examples of anionic surfactants are as follows: calcium, zinc, magnesium, and nickel stearates. An example of an effective cationic surfactant is a quaternized amine sold under the tradename "Quaternary O" by the Ciba-Geigy Corporation.

All other conditions and measures of the method of the invention are those conventionally employed in the previously known methods for the bulk polymerization of vinyl chloride involving two stage polymerization as disclosed in British Pat. No. 1,047,489 and U.S. Pat. No. 3,522,227, both of which are hereby incorporated by reference. In the following abbreviated description of this process, for the sake of simplicity, the initial stage of the polymerization or copolymerization will be referred to as first stage polymerization and the vessel in which this initial stage of polymerization is carried out will be referred to as a "prepolymerizer". The final or complementary stage of the polymerization will be called simply second stage polymerization and the vessel in which it is carried out the "polymerizer".

In the first stage polymerization, the means chosen to agitate the monomer or monomers is of a type capable of rotating at high speed and is commonly referred to as a "turbine type" agitator. At the start of the first stage polymerization, the vessel is charged with a monomer composition to which a catalyst has been added. Any polymerization catalyst generally used in bulk polymerization methods, that is organic peroxides such as peroxydicarbonates, and dilauroyl peroxide, benzoyl peroxide or other organic radical formers such as azo compounds in which both azo nitrogen atoms are connected with a tertiary carbon atom, the other valences of which are saturated by nitrile, carboxy, alkyl, cycloalkylene, alkyl, or alkyl-OOC radicals, or radiation rich in energy, such as ultraviolet light, can of course, also be used to an extent which is usual for bulk polymerization processes. After addition of the vinyl chloride monomer to the prepolymerizer, a small amount of monomer is vented in order to blow the air out of the first stage polymerizing vessel. The speed of the turbine type agitator generally lies between 200 and 1500 revolutions per minute but these figures should not be regarded as limiting values. As soon as a conversion of at least about 3 percent of the monomer composition has been obtained in the prepolymerizer, the contents of the vessel are transferred to a polymerization vessel equipped to provide slow speed agitation so as to insure proper temperature control of the reaction medium until a final monomer conversion of about 70 percent has been achieved.

The reaction temperature in both first and second stage prepolymerization vessels ranges between about 30° centigrade to about 70° centigrade. The reaction pressure range is about 70 to about 200 pounds per square inch.

Examples of monomers that can be copolymerized with vinyl chloride are vinylidine chloride and vinyl esters such as vinyl acetate. The proportion of vinyl chloride should amount to at least 80 percent by weight of the monomers employed.

The optical microscope and sieve analysis were used as a methods of determining average particle size. A magnification of 155 times was used together with an eye piece having a scale graduated in microns to determine the average particle size directly in microns. A 325 mesh screen having openings of 44 microns was used.

The molecular weight of the polymers presently commercially produced by bulk polymerization ranges from about 40,000 to about 125,000 by the weight average method. The ASTM method 1243 method A (1 percent in cyclohexanone) was also used to determine molecular weight by relative viscosity. The polymers produced varied by this method between 1.6 and 2.7.

Laboratory experiments were run using a 1 liter capacity glass reactor. Intermediate scale-up was done on 2.5 and 5 gallon capacity reactor equipment made of stainless steel. Plant facilities for the bulk polymerization were as follows: A first stage stainless steel reactor utilizing an agitator of the turbine type having a maximum rotational speed of 2000, revolutions per minute and a second stage stainless steel reactor of the ribbon blender type utilizing slow speed agitation.

A great deal of laboratory work was done utilizing only a first stage polymerization reactor having high speed agitation because in small laboratory size second stage reactors, it has been difficult to obtain the uniformity of mixing which is more readily obtainable in the large plant batch equipment or in the intermediate scale equipment. Labortory experiments were thus run in a one liter first stage reactor at low conversions, that is, between about 3 and about 15 percent and these experiments were used to predict the particle size ultimately to be obtained had these particle conversions been carried to the 70 to 75 percent conversion usually attained by using a second stage reactor.

In order to further illustrate this invention but without being limited thereto, the following examples are given. All percentages are expressed by weight and all temperatures are in degrees centigrade unless otherwise indicated.

EXAMPLE 1

In a vertical type first stage reactor of 2 ½ gallon capacity and stainless steel construction, equipped with a turbine type agitator capable of speeds in excess of 1200 revolutions per minute, were added 32.0 grams of fumed silica treated with dichlorodimethyl silane, 0.77 milliliters of a 29 percent solution of acetyl cyclohexanesulfonyl peroxide in dimethyl phthalate sold under the tradename of "Lupersol 228P" by the Lucidol Division of the Pennwalt Company and 2.5 milliliters of a 40 percent solution of di-2, ethylhexyl peroxydicarbonate in mineral spirits, sold under the tradename "Lupersole 223M" by the Lucidol Division of the Pennwalt Company. 14.5 pounds of vinyl chloride were added to the reactor at a temperature of 20° centigrade and 1.5 pounds of the vinyl chloride monomer were vented to the atmosphere to remove air from the reactor. The mixture in the reactor was raised in temperature while agitating using the turbine type agitator at a speed of 1200 revolutions per minute to a temperature of 70° C. over a period of 45 minutes and maintained at 70° C. for a period of 15 minutes. Approximately 7 percent of the monomer composition added to the vessel had been converted to polymer.

The mixture was then transferred to a 5 gallon stainless steel reaction vessel containing 3.9 milliliters of "Lupersol 228P", 6.3 milliliters of "Lupersol 223M" and 7.5 pounds of vinyl chloride. 1.5 pounds of vinyl chloride were vented in order to clear the air from the reactor. The mixture was heated to 50° centigrade and maintained at that temperature over a period of four hours. The monomer that has not reacted is blown off and collected in a condensing circuit incorporating a filters so as to separate any particles of polymer carried over. The final traces of residual monomer absorbed by the particles of polymer are eliminated by placing the polymerizer under vacuum twice in succession and changing over to a nitrogen atmosphere in between. All the polymer composition is then passed through screening equipment. In this way a powdery polymer is obtained in a yield of 78 percent by weight based on the weight of the monomer used. The polymer has an average particle size of 44 microns as indicated by the fact that 50 percent of the polymer particles pass through a 44 micron screen. Relative viscosity was 2.38.

EXAMPLE 2 — Control

For purposes of comparison only, a polyvinyl chloride homopolymer was prepared using identical proportions and conditions as described above with the exception of the ommission of fumed silica. The polymer obtained in 63 percent yield had an average particle size of 105 microns as judged by the fact that 50 percent of the polymer produced passed through a 105 micron screen. Less than 1 percent of the polymer passes through 44 micron screen. Relative viscosity was 2.56.

EXAMPLE 3 — Control

A polymer representative of those produced by methods of the prior art was prepared as follows:

A vertical cylindrical reactor of stainless steel of 3,000 gallons capacity provided with an agitator of the turbine type as previously described and illustrated in British Pat. No. 1,047,489 was charged with 13,000 pounds of vinyl chloride monomer and 0.7 pounds of acetylcyclohexanesulfonylperoxide and 1.8 pounds of di-2-ethylhexyl peroxydicarbonate. The agitator was turned on and set to revolve at 200 revolutions per minute. The temperature was raised from 20 degrees centigrade to 70° centigrade and the pressure was maintained at 167 pounds per square inch. These conditions were maintained throughout the first stage of polymerization which lasted approximately ¾ hour. All other standard methods of carrying out the operation of polymerization in mass were observed. The temperature was maintained by a flow of water through the water jacket which covered the reactor. After ¼ hour, the contents of the reactor were transferred to a second reactor having a ribbon blender type agitation, previously described and shown in British Pat. No. 1,047,489 for the completion of the polymerization. In this second reactor were added 5,000 pounds of vinyl chloride monomer and 1.3 pounds of acetylcyclohexanesulfonylperoxide together with 3.1 pounds of di-2-ethylhexyl peroxydicarbonate prior to transfer of the contents of the first stage reactor to the second stage reactor. The pressure on the reactor was raised to 97 psig and the reaction continued over a period of 5 hours at 60° centigrade. After a total elapsed time of 5 ¼ hours, the reactor was vented and all the monomer which had not polymerized was vaporized and conducted to a condenser line which includes a cyclone and a filter in order to trap the grains of polymer which were entrained by the escaping gases. The last traces of monomer which had been absorbed by the polymer were extracted by two extractions of the reactor under reduced pressure, each of which were followed by scavaging with a current of nitrogen. The discharge hatch of the reactor was then opened and the average size of the particles were determined by screen analysis of alternately examined under the microscope using 155 times magnification to determine average particle size. The polymer showed an average particle size of 120 microns by microscopic observation and a relative viscosity of 2.33.

EXAMPLE 4

In order to illustrate the correlation between laboratory preparation of polymers using only a single stage 1 liter capacity reactor at low conversion and large scale preparation using both first and second stage reactors, a formula similar in percentage to that of Example 3 was prepared in the laboratory using a 1 liter reactor equipped with high speed agitation as previously described. The first stage polymerization was conducted using a pressure of 167 psig over a period of 15 minutes at a temperature of 70° centigrade as in the first stage of Example 3 above. A conversion of 7 percent was obtained and a particle size of 115 microns as determined by microscopic observation was obtained.

EXAMPLE 5

An experiment was run using the 2.5 gallon reactor in the first stage and the 5 gallon reactor in the second stage with identical proportions and conditions as described in Example 3 with the exception of the addition of 0.012 pounds (0.1 percent of monomer present) of calcium stearate having a particle size of 40 microns to the first stage reactor. The first stage reaction was conducted at 70° centigrade for a period of one hour at a pressure of 167 pounds per square inch and a second stage reaction was conducted for a period of 4 ½ hours at 97 pounds per square inch and 52 degrees centigrade. A total conversion of 75 percent of the monomers added was obtained and a particle size of 55 microns was observed by microscopic observation.

EXAMPLE 6

For purposes of comparison with Example 5, a formula having identical percentages of ingredients was prepared in the 1 liter laboratory first stage reactor, using conditions as described in Example 4, except that the temperature attained during the first stage polymerization was 60° centigrade. A conversion of 8.6 percent was obtained and by microscopic observation, the average particle size of the polymer obtained was determined as 63 microns.

EXAMPLE 7

In the reactors described in Example 3, 12,000 pounds of vinyl chloride monomer were added to 2 pounds of acetylcyclohexanesulfonylperoxide and 4.9 pounds of di-2-ethylhexylperoxydicarbonate together with 20 pounds of a fumed silica sold under the tradename of "AerosilR-972" and 12 pounds of octylphenoxy polyethoxyethanol sold under the tradename of "Triton X-100" by the Rohm and Haas Company. The reaction conditions were the same as those described in Example 3 above during the first stage, but during the second stage, the reaction temperature was 52° centigrade. An average particle size of 48 microns was obtained as determined by microscopic observation.

EXAMPLE 8

For purposes of comparison, with Example 7, a formula identical in composition to Example 7 was run in a 1 liter laboratory first stage reactor as described in Example 4. Incorporation of the same percentage amounts of "Aerosil R-972" and "Triton X-100" provided a 26 micron particle size product as determined by microscopic analysis after a conversion of 8.6 percent at 60° centigrade.

EXAMPLE 9

The formulation of Example 7 was used in equipment as described in Example 1 with the polymerization being conducted in the first stage at 70° centigrade and the second stage at 52° centigrade to provide at 72 percent conversion, a particle size of 39 microns. Particle size was determined by microscopic observation.

EXAMPLE 10

Using the laboratory 1 liter capacity reactor equipped with high speed agitation, a formula corresponding in percentage to that shown in Example 1 was prepared. Polymerization was conducted at 60 degrees centigrade and a particle size of 43 microns was obtained by microscopic observation at a conversion of 9.7 percent.

Further examples of the invention follow which utilize either scale-up facilities involving a 2 ½ gallon stainless steel first stage reactor and a 5 gallon stainless steel second stage reactor or alternately the 1 liter first stage reactor alone as illustrated in the proceeding examples. It has been shown by the results obtained in the previous examples, that at low conversions in the first stage without going on to the second stage of the reaction, it is often possible to predict the ultimate particle size to be obtained by completing the reaction through the final second stage conversion. Thus, the examples which follow are indicative of the ultimate particle size to be obtained upon completing the reaction through the second stage reactor even though the reaction is stopped at low reaction after the first stage reaction.

EXAMPLE 11

Using the procedure and apparatus as described in Example 1 with the exception that 0.1 percent of calcium stearate based upon the percent monomer present is added to the ingredients in the first stage reactor and a temperature of 70° centigrade is maintained during the first stage and 55° centigrade during the second stage, a resin was obtained at a conversion of 92 percent having an average particle size of 51 microns as determined by microscopic observation.

EXAMPLE 12

Using procedures and percentages of ingredients identical with those described in Example 4 above, with the exception of the use in the first stage of 0.1 percent of calcium stearate based upon the monomer present, a particle size of 72 microns was obtained when the reaction was run at 65° centigrade to produce a 3.5 percent conversion. The particle size was determined by microscopic observation.

EXAMPLE 13

Using the same procedure as described in Example 4 above with the exception of the addition of 0.1 percent lithium stearate in the first stage polymerization, a particle size of 101 microns was obtained as determined by microscopic observation when the reaction was run at 65° centigrade to produce a conversion of 3.4 percent. The particle size reduction obtained with lithium stearate is insignificant as compared to that obtained with calcium stearate. The particle size obtained using lithium stearate in the first stage of the reaction is only very slightly reduced from that obtained in Example 4 with no additive.

EXAMPLES 14, 15, 16, 17, 18, 19 and 20

A series of first stage polymerizations were run using identical proportions of ingredients and procedures as described in Example 4 except that the polymerizations were run at 60° centigrade and a series of additives were used in the first stage polymerization in the following percentages by weight based upon the percentages of monomer present. The addition of 0.1 percent zinc stearate at a 4.2 percent conversion provided a polymer with an average particle size by microscopic observation of 46 microns. The addition of 0.1 percent magnesium stearate at a 2.2 percent conversion provided a polymer with an average particle size of 58 microns as determined by microscopic observation. The addition of 0.1 percent nickel stearate provided a polymer at 8.4 percent conversion having an average particle size of 60 microns as determined by microscopic observation. The addition of 0.1 percent magnesium stearate provided a polymer having an average particle size of 60 microns at 7.6 percent conversion. With the addition of 0.25 percent calcium maleate, a 10 percent conversion was achieved and an average particle size of 85 microns was obtained as determined by microscopic observation. Use of 0.2 percent calcium epoxy soyate additive and a polymerization temperature of 60° centigrade provides an 8.1 percent conversion. An average particle size of 85 microns was obtained as determined by microscopic observation. Using 0.4 percent of sodium lauryl sulfate and a 60° centigrade reaction temperature, a 9.2 percent conversion was obtained of polyvinyl chloride having an average particle size of 70 microns as determined by microscopic observation.

What is claimed is:

1. In a process for the preparation of polymers and copolymers of vinyl chloride by bulk homopolymerization or copolymerization of a monomer or monomers wherein said vinyl chloride amounts to at least 80 percent by weight of the monomer employed and wherein polymerization is carried out in a stationary reaction zone in a first stage during which a reaction mixture is subjected to high speed agitation until about 3 percent to about 15 percent of said monomer or monomers have been converted to polymer and in which said polymerization is completed in a second stage during which said reaction mixture is subjected to low speed agitation until the reaction has been completed, the improvement which comprises carrying out said polymerization of said monomer or monomers in said first stage in contact with (1) a combination of a surface active agent which has both hydrophilic and hydrophobic moieties and an additive comprising an organic or inorganic, inert, fine particle size material, solid at least at reaction temperatures, and insoluble in said monomer or monomers (2) said additive alone; wherein said additive has an average particle size of about 0.001 to about 50 microns whereby there is obtained polymer product having an average particle size of 85 microns or under.

2. A process according to claim 1 wherein said additive consists of a fumed silica having a surface treated with a dichlorodimethyl silane, and having an average particle size of between 0.01 to about 50 microns, said additive being present in the amount of about 0.01 to about 5 percent by weight based upon said monomer or monomers.

3. The process according to claim 1 wherein said additive consists of a fumed silica having an average particle size of between 0.01 to about 50 microns and is present in the amount of about 0.01 to about 5 percent by weight based upon said monomer or monomers.

4. The process according to claim 1 wherein said polymerization is carried out in said first stage in contact with from about 0.01 to about 5 percent by weight based upon the weight of said monomer or monomers present in said first stage of said surface active agent selected from the group consisting of cationic, anionic, and nonionic surfactants and wherein said additive has an average particle size of between about 0.01 to about 50 microns and is present in the amount of 0.01 to about 5 percent by weight based upon solid monomer or monomers and wherein said additive is selected from the group consisting of fumed silica and fumed silica having a surface treated with a dichlorodimethyl silane.

5. The process according to claim 4 wherein said surface active agent is octylphenoxy polyethoxyethanol.

6. The polymer product of the process of claim 1.

7. The process of claim 1 wherein the combination of the surface active agent and the inert fine particle size additive are present in said first polymerization reaction stage.

8. The process of claim 7 wherein said inert fine particle size additive is fumed silica having a surface treated with dichlorodimethyl silane.

9. The process of claim 8 wherein said surface active agent is octyl phenoxy polyethoxy ethanol.

10. The polymer product of the process of claim 9.

* * * * *